United States Patent [19]

Wada et al.

[11] Patent Number: 4,626,393
[45] Date of Patent: Dec. 2, 1986

[54] METHOD OF MANUFACTURING LOW TEMPERATURE SINTERED CERAMIC MATERIALS FOR USE IN SOLID DIELECTRIC CAPACITORS OR THE LIKE

[75] Inventors: Takeshi Wada, Harunamachi; Hiroshi Nakamura, Fujioka; Masami Fukui; Nobutatsu Yamaoka, both of Harunamachi, all of Japan

[73] Assignee: Taiyo Yuden Co., Ltd., Tokyo, Japan

[21] Appl. No.: 753,169

[22] Filed: Jul. 9, 1985

Related U.S. Application Data

[62] Division of Ser. No. 676,652, Nov. 30, 1984.

[30] Foreign Application Priority Data

Nov. 30, 1983 [JP] Japan ............................. 58-225564
Nov. 30, 1983 [JP] Japan ............................. 58-225565

[51] Int. Cl.$^4$ .................. C04B 35/46; C04B 40/00; H01G 4/10; H01G 4/12
[52] U.S. Cl. .................................. 264/65; 264/61; 264/66; 264/82; 361/320; 361/321
[58] Field of Search ............................ 264/61, 65, 66, 82

[56] References Cited

U.S. PATENT DOCUMENTS

| | | | |
|---|---|---|---|
| 4,101,952 | 7/1978 | Burn | 361/320 |
| 4,106,075 | 8/1978 | Baumann et al. | 361/320 |
| 4,115,493 | 9/1978 | Sakabe et al. | 264/61 |
| 4,223,369 | 9/1980 | Burn | 361/320 |
| 4,283,753 | 8/1981 | Burn | 361/321 |
| 4,308,570 | 12/1981 | Burn | 361/320 |
| 4,386,985 | 6/1983 | Dirstine | 264/61 |
| 4,451,869 | 5/1984 | Sakabe et al. | 361/321 |
| 4,477,401 | 10/1984 | Hagemann et al. | 264/61 |
| 4,568,650 | 2/1986 | Coblenz et al. | 264/82 |
| 4,571,276 | 2/1986 | Akse | 361/321 |

*Primary Examiner*—Helen M. McCarthy
*Attorney, Agent, or Firm*—Woodcock Washburn Kurtz Mackiewicz & Norris

[57] ABSTRACT

A ceramic composition capable of sintering at a sufficiently low temperature to enable the use of a low cost base metal as the electrode material in the fabrication of capacitors. The major ingredient of the composition is expressed as $Ba_{k-x-y}M_xL_yO_kTiO_2$, where M is at least either of mag-nesium and zinc, L is at least either of strontium and calcium, k, x and y are numerals in the ranges of 1.00 to 1.04, 0.002 to 0.049, and 0.001 to 0.048, respectively, and x+y is a value in the range of 0.02 to 0.05. To this major ingredient is added a minor proportion of a mixture of lithium oxide, silicon dioxide, and, possibly, at least one of barium oxide, calcium oxide, and strontium oxide. For the fabrication of coherently bonded bodies of this composition, as for use as the dielectric bodies of capacitors, the moldings of the mixture of the major ingredient and additive in finely divided form are sintered in a reductive or neutral atmosphere and then reheated at a lower temperature in an oxidative atmosphere. The sintering temperature can be so low (typically from 1050° to 1200° C.) that the moldings can be co-sintered with base metal electrodes buried therein without difficulties encountered heretofore.

4 Claims, 4 Drawing Figures

METHOD OF MANUFACTURING LOW TEMPERATURE SINTERED CERAMIC MATERIALS FOR USE IN SOLID DIELECTRIC CAPACITORS OR THE LIKE

This is a division of application Ser. No. 676,652, filed 11/30/84.

BACKGROUND OF THE INVENTION

Our invention relates to dielectric ceramic compositions that allow sintering or firing at lower temperatures than heretofore, and to a process for the fabrication of coherently bonded bodies of such compositions. The low temperature sintered ceramic mateials of our invention find a typical application in solid dielectric capacitors, particularly in those of the monolithic or multilayered design, making possible the use of a base metal as the material for the film electrodes of such capacitors.

Multilayered ceramic capacitors are known which employ noble metals such as platinum and palladium as the electrode materials. For the manufacture of such multilayered capacitors, as heretofore practiced, there are first prepared green dielectric sheets from the proportioned ingredients for a dielectric ceramic material in finely divided form. An electroconductive paste containing powdered platinum or palladium is then "printed" on the green sheets in a desired pattern. Several such printed green sheets are stacked up, pressed together, and sintered in an temperature range of 1300° to 1600° C. in an oxidative atmoshere. This conventional method makes possible the simultaneous production (co-sintering) of the dielectric ceramic bodies and the film electrodes interleaved therein. It is also an acknowledged advantage of the known method that the noble metal electrodes are totally unaffected by the high temperature sintering in an oxidative atmosphere. Offsetting all these advantages is the expensiveness of the noble metals, which adds considerably to the costs of the multilayered ceramic capacitors.

A solution to this problem is found in Sakabe et al. U.S. Pat. No. 4,115,493 issued Sept. 19, 1978. This patent proposes a method of making a monolithic ceramic capacitor with use of a base metal such as nickel, iron or cobalt, or an alloy thereof, as the electrode material. According to this prior art method, a paste of a powdered base metal is screened on green dielectric sheets, and the pasted sheets are stacked, pressed together, and fired in a temperature range of 1300° to 1370° C. in a reductive atmosphere containing hydrogen. The oxidation of the pasted base metal particles is thus avoided.

We do, however, object to the Sakabe et al. method for the following reasons. We have discovered from experiment that the firing temperature range of 1300° to 1370° C. suggested by this prior art method leads to easy flocculation of the particles of nickel or like base metal pasted on the green dielectric sheets. The base metal particles have also been found to tend to diffuse into the ceramic bodies when fired in that temperature range. The flocculation and diffusion of the base metal particles are, of course, both undesirable as the resulting capacitors will not possess desired values of capacitance and insulation resistance.

SUMMARY OF THE INVENTION

Our invention provides a solution to the problem of how to reduce the sintering temperature of ceramic compositions, particularly in the manufacture of solid dielectric capacitors, to make possible the use of a low cost base metal as the electrode material without the noted difficulties encountered heretofore. The low temperature sintered ceramic material in accordance with our invention are also well calculated for the provision of capacitors of very favorable performance characteristics.

Stated in brief, a low temperature sintered ceramic material in accordance with our invention consists essentially of 100 parts by weight of a major ingredient expressed by the formula $Ba_{k-x-y}M_xL_yO_kTiO_2$, and 0.2 to 10.0 parts by weight of an additive mixture of lithium oxide ($Li_2O$) and silicon dioxide ($SiO_2$). In the formula of the major ingredient, M is at least either of magnesium (Mg) and zinc (Zn); L is at least either of strontium (Sr) and calcium (Ca); k is a numeral in the range of 1.00 to 1.04; x is a numeral in the range of 0.002 to 0.049; y is a numeral in the range of 0.001 to 0.048; and $x+y$ is a value in the range of 0.02 to 0.05. The additive mixture may, or may not, additionally comprise at least one metal oxide (MO) selected from the group consisting of barium oxide (BaO), calcium oxide (CaO), and strontium oxide (SrO).

According to the method of our invention, for the fabrication of coherently bonded bodies of the above low temperature sinterable ceramic composition, there are first prepared the major ingredient, $Ba_{k-x-y}M_xL_yO_k$-$TiO_2$, and the additive mixture of $Li_2O$ and $SiO_2$, with or without MO, in the above suggested proportions. After having been initimately mixed together, the major ingredient and additive are molded into bodies of desired shape and size. The moldings are subsequently sintered in a nonoxidative (i.e. neutral or reductive) atmosphere and then reheated in an oxidative atmosphere.

The dielectric ceramic composition of our invention, set forth in the foregoing, makes it possible to sinter the moldings in nonoxidative atmosphere at temperatures less than 1200° C. A temperature range for this sintering operation is from 1050° C. to 1200° C. for the best results. The sintering temperatures of less than 1200° C. enable the use, in the fabrication of capacitors with the ceramic composition of our invention as the dielectric, of nickel or like low cost base metal as the electrode material without the difficulties that have been pointed out in connection with the prior art. The sintering temperature might be above 1200° C. Should it exceed 1300° C., however, the base metal particles pasted on dielectric bodies might flocculate or diffuse. Should the temperature be too low, on the other hand, then the dielectric bodies might not be sintered to maturity. Hence the preferred temprature range of 1050° to 1200° C. We recommend this temperature range not only because the base metal electrodes can be formed favorably but also because it realizes a substantial curtailment of the energy that has heretofore been consumed for firing the dielectric moldings.

The reheating of the sintered bodies in an oxidative atmosphere in accordance with the method of our invention is intended to compensate for the oxygen vacancies in the bodies that have been caused by the previous firing in a nonoxidative atmosphere and hence to increase their insulation resistance to a required degree. Thus the sintered bodies may be reheated at temperatures ranging from 500° C. to 1000° C. The reheating temperature should be lower than the preceding sintering temperature.

We also recommend that the periods of time for the sintering in a nonoxidative atmosphere and for the reheating in an oxidative atmosphere be minimums required for the accomplishment of the purposes for which the treatments are intended, respectively. Experiment has proved that the moldings should be sintered at the maximum temperature for two to four hours, and subsequently reheated for 10 to 60 minutes, for the best results.

In addition to the advantages already set forth, our invention makes possible the provision of capacitors having specific dielectric constants of over 2000, dielectric losses of less than 2.5 percent, resistivity of over $1 \times 10^6$ megohm-centimeters, and temperature dependences of capacitances of plus or minus 10 percent in a temperature range of $-25°$ to $+85°$ C.

The above and other features and advantages of our invention and the manner of realizing them will become more apparent, and the invention itself will best be understood, from a study of the following detailed description and appended claims, with reference had to the attached drawings.

DETAILED DESCRIPTION

Figure 1:
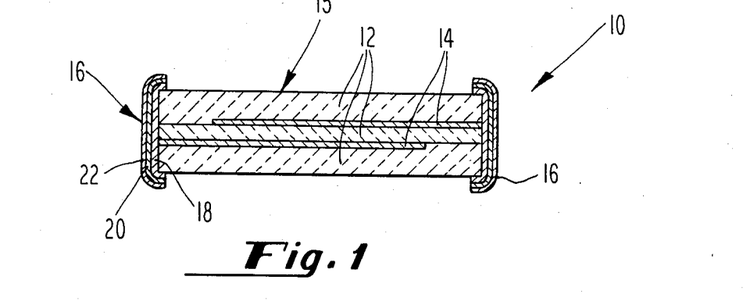
FIG. 1 is a sectional representation of an experimental multilayered ceramic capacitor employing the low temperature sintered ceramic material of our invention, the capacitor being representative of numerous test capacitors fabricated in the Examples of the invention set forth subsequently.

We have illustrated in FIG. 1 one of many similar multilayered ceramic capacitor fabricated in various Examples of our invention by way of a possible application of our invention, each capacitor having its dielectric body formulated in accordance with the composition and method of our invention. Generally designated by the reference numeral 10, the representative capacitor is shown to have an alternating arrangement of three dielectric ceramic layers 12 and two film electrodes 14. The dielectric layers 12 have, of course, the low temperature sintered ceramic material of our invention. The film electrodes 14, which can be of a low cost base metal such as nickel, extend into the middle of the dielectric body 15, composed of the three dielectric layers 12, from the opposite sides thereof into a partly opposed relation with each other. A pair of conductive terminations 16 contact the respective film electrodes 14. Each termination 16 comprises a baked on zinc layer 18, a plated on copper layer 20, and a plated on solder layer 22.

Typically, and as fabricated in the subsequent Examples of our invention, the intermediate one of the three dielectric layers 12 has a thickness of 0.02 millimeters. The area of that part of each film electrode 14 which is opposed to the other film electrode is 25 square millimeters (5×5 millimeters).

EXAMPLE I

In this Example, we fabricated 28 different sets of multilayered ceramic capacitors, each constructed as in FIG. 1, having their dielectric bodies 15 formulated in accordance with the compositions set forth in Table 1. The major ingredient of the ceramic compositions in accordance with our invention has been expressed as $Ba_{k-x-y}M_xL_yO_kTiO_2$, where M is at least either of Mg and Zn and where L is at least either of Sr and Ca. Accordingly, in Table 1, we have given the specific atomic numbers, as represented by k-x-y, x, y and k, of the elements Ba, M (Mg and/or Zn), L (Sr and/or Ca) and O of the major ingredient, as well as the total atomic numbers of Mg and Zn and the total atomic numbers of Sr and Ca. We employed a mixture of only $Li_2O$ and $SiO_2$ as an additive in this Example. Table 1 specifies the amounts, in parts by weight, of this additive with respect to 100 parts by weight of the major ingredient, and the relative proportions, in mole percent, of $Li_2O$ and $SiO_2$.

TABLE 1

| | Ceramic Compositions | | | | | | | | | | |
|---|---|---|---|---|---|---|---|---|---|---|---|
| | Major Ingredient (100 wt. pt.) | | | | | | | | Additive | | |
| Test | | x | | | y | | | | Propn. | Comp. (mole %) | |
| No. | k − x − y | Mg | Zn | Total | Sr | Ca | Total | k | (wt. pt.) | $Li_2O$ | $SiO_2$ |
| 1 | 1.02 | 0.005 | 0.005 | 0.01 | 0.005 | 0.005 | 0.01 | 1.04 | 1.0 | 27 | 73 |
| 2 | 1.02 | 0.005 | — | 0.005 | 0.005 | — | 0.005 | 1.03 | 7.0 | 40 | 60 |
| 3 | 1.02 | 0.01 | 0.01 | 0.02 | 0.01 | — | 0.01 | 1.05 | 5.0 | 40 | 60 |
| 4 | 1.01 | — | 0.005 | 0.005 | — | 0.005 | 0.005 | 1.02 | 1.0 | 40 | 60 |
| 5 | 1.01 | — | 0.01 | 0.01 | 0.005 | 0.005 | 0.01 | 1.03 | 12.0 | 40 | 60 |
| 6 | 1.01 | 0.005 | — | 0.005 | — | 0.025 | 0.025 | 1.04 | 1.0 | 40 | 60 |
| 7 | 1.00 | — | 0.01 | 0.01 | — | 0.01 | 0.01 | 1.02 | 0.2 | 48 | 52 |
| 8 | 1.00 | — | 0.01 | 0.01 | 0.01 | 0.01 | 0.02 | 1.03 | 3.0 | 40 | 60 |
| 9 | 1.00 | — | 0.01 | 0.01 | — | 0.03 | 0.03 | 1.04 | 1.0 | 40 | 60 |
| 10 | 0.99 | 0.01 | 0.01 | 0.02 | — | 0.02 | 0.02 | 1.03 | 3.0 | 55 | 45 |
| 11 | 0.99 | — | 0.002 | 0.002 | — | 0.048 | 0.048 | 1.04 | 10.0 | 50 | 50 |
| 12 | 0.99 | 0.049 | — | 0.049 | — | 0.001 | 0.001 | 1.04 | 0.2 | 25 | 75 |
| 13 | 0.98 | 0.01 | — | 0.01 | 0.01 | — | 0.01 | 1.0 | 10.0 | 50 | 50 |
| 14 | 0.98 | — | 0.005 | 0.005 | 0.025 | — | 0.025 | 1.01 | 0.2 | 27 | 73 |
| 15 | 0.98 | — | 0.03 | 0.03 | — | 0.01 | 0.01 | 1.02 | 0.2 | 40 | 60 |
| 16 | 0.98 | 0.01 | 0.01 | 0.02 | 0.01 | 0.01 | 0.02 | 1.02 | 3.0 | 33 | 67 |
| 17 | 0.98 | 0.01 | 0.01 | 0.02 | 0.02 | — | 0.02 | 1.02 | 0.0 | — | — |
| 18 | 0.98 | — | 0.02 | 0.02 | 0.02 | 0.01 | 0.03 | 1.03 | 1.0 | 27 | 73 |
| 19 | 0.97 | 0.01 | — | 0.01 | 0.01 | 0.01 | 0.02 | 1.00 | 1.0 | 48 | 52 |

TABLE 1-continued

| Test No. | $k - x - y$ | Major Ingredient (100 wt. pt.) | | | | | | $k$ | Additive | | |
|---|---|---|---|---|---|---|---|---|---|---|---|
| | | x | | | y | | | | Propn. (wt. pt.) | Comp. (mole %) | |
| | | Mg | Zn | Total | Sr | Ca | Total | | | Li$_2$O | SiO$_2$ |
| 20 | 0.97 | 0.01 | — | 0.01 | 0.03 | — | 0.03 | 1.01 | 5.0 | 33 | 67 |
| 21 | 0.97 | 0.01 | 0.01 | 0.02 | 0.02 | 0.01 | 0.03 | 1.02 | 5.0 | 20 | 80 |
| 22 | 0.97 | 0.02 | 0.02 | 0.04 | 0.01 | 0.01 | 0.02 | 1.03 | 0.2 | 33 | 67 |
| 23 | 0.96 | 0.03 | — | 0.03 | 0.01 | — | 0.01 | 1.00 | 1.0 | 25 | 75 |
| 24 | 0.96 | 0.02 | — | 0.02 | 0.01 | 0.02 | 0.03 | 1.01 | 1.0 | 33 | 67 |
| 25 | 0.95 | 0.002 | — | 0.02 | 0.048 | — | 0.048 | 1.00 | 0.2 | 25 | 75 |
| 26 | 0.95 | — | 0.049 | 0.049 | 0.001 | — | 0.001 | 1.0 | 10.0 | 50 | 50 |
| 27 | 0.93 | 0.02 | — | 0.02 | 0.03 | — | 0.03 | 0.98 | 7.0 | 40 | 60 |
| 28 | 0.989 | 0.001 | — | 0.001 | — | 0.02 | 0.02 | 1.00 | 1.0 | 50 | 50 |

Thus, according to Test No. 1 of Table 1, for instance, the major ingredient was Ba$_{1.02}$M$_{0.01}$L$_{0.01}$O$_{1.04}$TiO$_2$ or, more exactly, Ba$_{1.02}$Mg$_{0.005}$Zn$_{0.005}$Sr$_{0.005}$O$_{1.04}$TiO$_2$. One hundred parts by weight of this major ingredient was admixed with 1.0 parts by weight of a mixture of 27 mole percent Li$_2$O and 73 mole percent SiO$_2$.

For the fabrication of test capacitors of the Test No. 1 composition, we started with the preparation of the major ingredient, Ba$_{1.02}$Mg$_{0.005}$Zn$_{0.005}$Sr$_{0.005}$O$_{1.04}$TiO$_2$. We first prepared 926.39 grams of BaCO$_3$, 0.94 grams of MgO, 1.88 grams of ZnO, 3.40 grams of SrCO$_3$, 2.32 grams of CaCO$_3$, and 368.44 grams of TiO$_2$, all with purities of over 99.0 percent. Expressed in mole parts, the relative proportions of the above prepared BaCO$_3$, MgO, ZnO, SrO, CaO, and TiO$_2$ were 1.02, 0.005, 0.005, 0.005, 0.005, and 1.0, respectively, aside from the impurities contained in the start materials. These start materials were wet mixed together for 15 hours. Then the mixture was dried at 150° C. for four hours, pulverized, and calcined in air at about 1200° C. for two hours. The major ingredient was thus obtained in finely divided form.

We prepared the additive of Test No. 1 by first preparing a mixture of 31.26 grams (27 mole percent) of Li$_2$CO$_3$ and 68.74 grams (73 mole percent) of SiO$_2$. To this mixture was added 300 cubic centmeters of alcohol, and the resulting mixture was agitated for 10 hours in a polyethylene pot with alumina balls. Then the mixture was air fired at 1000° C. for two hours. Then, charged into an alumina pot together with 300 cubic centimeters of water, the mixture was crushed with alumina balls for 15 hours. Then the crushed mixture was dried at 150° C. for four hours. There was thus obtained the desired additive mixture of 27 mole percent Li$_2$O and 73 mole percent SiO$_2$ in finely divided form.

Then 1000 grams of the above prepared major ingredient and 10 grams (one weight percent) of the above prepared additive was mixed together. Further, to this mixture, we added 15 percent by weight of an organic binder and 50 percent by weight of water with respect to the total amount of the major ingredient and the additive. The organic binder was an aqueous solution of acrylic ester polymer, glycerine, and condensed phosphate. All these were ball milled into a slurry. Then this slurry was defoamed in vacuum. Then the deformed slurry was introduced into a reverse roll coater thereby to be shaped into a thin, continuous strip on an elongate strip of polyester film. Then the continuous strip of the slurry was dried at 100° C. on the polyester film. The green (unsintered) ceramic strip thus obtained, about 25 microns thick, was subsequently cut into "squares" sized 10 by 10 centimeters.

For the fabrication of the base metal film electrodes 14, we prepared 10 grams of nickel in finely divided form, with an average particle size of 1.5 microns, and a solution of 0.9 gram of ethyl cellulose in 9.1 grams of butyl "Carbitol" (trademark for diethylene glycol monobutyl ether). Both were agitated for 10 hours to provide an electroconductive paste. Then this paste was "printed" on one surface of each green ceramic sheet, which had been prepared as above, through a screen having approximately 50 rectangular perforations sized 7 by 14 millimeters. Then, after drying the printed paste, two green ceramic sheets were stacked, with their printings directed upwardly, and with the printings on the two sheets offset from each other to an extent approximately one half of their longitudinal dimension. Further, four green ceramic sheets each with a thickness of 60 microns were stacked on each of the top and bottom surfaces of the two printed ceramic sheets. Then the stacked sheets were pressed in their thickness direction under a pressure of approximately 40 tons at 50° C., thereby bonding the stacked sheets to one another. Then the bonded sheets were cut in a latticed pattern into approximately 100 pieces.

We employed a furnace capable of atmosphere control for co-firing the above prepared green dielectric bodies and what were to become film electrodes buried therein. The bodies were first air heated to 600° C. at a rate of 100° C. per hour, thereby driving off the organic binder that had been used for providing the slurry of the powdered major ingredient and additive. Then, with the furnace atmosphere changed from air to a reductive (nonoxidative) atmosphere consisting of two percent by volume of molecular hydrogen and 98 percent by volume of molecular nitrogen, the furnace temperature was raised from 600° C. to 1160° C. at a rate of 100° C. per hour. The maximum temperature of 1160° C., at which the ceramic bodies could be sintered to maturity, was maintained for three hours. Then the furnace temperature was lowered to 600° C. at a rate of 100° C. per hour. Then the furnace atmosphere was again changed to air (oxidative atmosphere), and the temperature of 600° C. was maintained for 30 minutes in that atmosphere for the oxidative heat treatment of the sintered bodies. Then the furnace temperature was allowed to lower to room temperature. There were thus obtained the dielectric ceramic bodies 15, FIG. 1, co-sintered with the film electrodes 14 buried therein.

We proceeded to the production of the pair of conductive terminations 16 on both sides of each ceramic body 15. First, for the fabrication of the inmost zinc layers 18, an electroconductive paste composed of zinc, glass frit, and vehicle was coated on both sides of each ceramic body 15. The coatings were dried and air heated at 550° C. for 15 minutes, thereby completing the zinc layers 18, each in direct contact with one of the two film electrodes 14 buried in each ceramic body 15. Then the intermediate copper layers 20 were formed on the zinc layers 18 by electroless plating. The outermost solder layers 22 were formed subsequently by electroplating a lead-tin alloy onto the copper layers 20.

There were thus completed the fabrication of multilayered ceramic capacitors, each constructed as in FIG. 1, of Test No. 1. The composition of the sintered ceramic bodies 10 is substantially the same as that before sintering. Essentially, therefore, it is reasoned that the ceramic bodies 15 are of perovskite structures, with the additive (mixture of 27 mole percent $Li_2O$ and 73 mole percent $SiO_2$) substantially uniformly dispersed among the crystal grains of the major ingredient $(Ba_{1.02}Mg_{0.005}Zn_{0.005}Sr_{0.005}Ca_{0.005}O_{1.04}TiO_2)$.

We have so far described the method of fabricating multilayered ceramic capacitors in accordance with the composition of Test No. 1. As regards the other ceramic compositions of Table I, designated Tests Nos. 2 through 28, we manufactured similar multilayered ceramic capacitors through exactly the same procedure as that of Test No. 1 except for changes in the temperature of firing (sintering) in the reductive (nonoxidative) atmosphere.

The multilayered ceramic capacitors of Tests Nos. 1 through 28 were then tested as to their specific dielectric constants, dielectric losses, resistivities, and percent changes in capacitances from thoese at +20° C. to those at −25° C. and +85° C. We measured these electrical properties of the test capacitors as follows:

1. Specific Dielectric Constant

The capacitance of each test capacitor was first measured at a temperature of 20° C., a frequency of one kilohertz, and an effective voltage of 0.5 volt. Then the specific dielectric constant was computed from the measured value of capacitance, and the area (25 square millimeters) of each of the opposed parts of the film electrodes 14, and the thickness (0.02 millimeter) of that ceramic layer 12 which intervenes between the film electrodes.

2. Dielectric Loss

Under the same conditions as the specific dielectric constant.

3. Resistivity

Resistance between the pair of terminations 16 of each test capacitor was measured after the application of a direct current at 50 volts for one minute. Then resistivity was computed from the measured resistance value and size of each test capacitor.

4. Capacitance-Temperature Characteristic

The test capacitors were introduced into a thermostatic oven, and at temperatures of −25°, 0°, +20°, +40°, +60°, and +85° C., their capacitances were measured at a frequency of one kilohertz and an effective voltage of 0.5 volt. Then the percent changes of the capacitances from those at 20° C. to the other specified temperatures were ascertained.

Table 2 gives the results of the measurements by the above methods. It will be seen from this table that the specific dielectric constants of the Test No. 1 capacitors, for instance, averaged 3060, their dielectric losses 1.5 percent, their resistivities $2.8 \times 10^6$ megohm-centimeters, and their percent variations of capacitances from those at +20° C. to those at −25° and +85° C., −9.1 and +6.5 percent, respectively.

Figure 2:
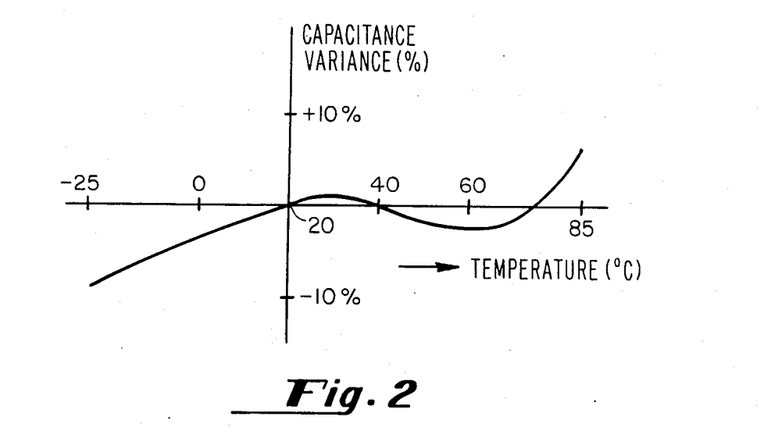
FIG. 2 is a graph plotting the average capacitance-temperature characteristic of test capacitors, each constructed as in FIG. 1, manufactured in Test No. 1 in Example I of our invention.

FIG. 2 graphically represents the average percent variations of the capacitances of the Test No. 1 capacitors at the above specified temperatures with respect to their capacitances at +20° C. It will be noted that the capacitance variations in the temperature range of −25° to −85° C. are all in the range of plus or minus 10 percent. This capacitance-temperature characteristic was typical of all the test capacitors of Example I; that is, if the percent variations of the capacitances of any groups of test capacitors at −25° and +85° C. were within plus or minus 10 percent, so were their capacitance variations at the other temperatures in between.

TABLE 2

| | | Firing Temperatures & Capacitor Characteristics | | | | |
|---|---|---|---|---|---|---|
| | | Capacitor Characteristics | | | | |
| Test No. | Firing Temp. (°C.) | Specific Dielectric Constant | Dielectric Loss (%) | Resistivity (megohm-cm) | Capacitance Variations (%) | |
| | | | | | At −25° C. | At +85° C. |
| 1 | 1160 | 3060 | 1.5 | $2.8 \times 10^6$ | −9.1 | +6.5 |
| 2 | 1070 | 2860 | 1.8 | $3.2 \times 10^6$ | −12.4 | +11.1 |
| 3 | 1250 | Not coherently bonded on firing. | | | | |
| 4 | 1150 | 3030 | 1.6 | $2.9 \times 10^6$ | −12.2 | +16.5 |
| 5 | 1070 | 2780 | 3.5 | $3.2 \times 10^5$ | −7.4 | +2.6 |
| 6 | 1150 | 3140 | 1.7 | $2.4 \times 10^6$ | −7.2 | +1.8 |
| 7 | 1170 | 3220 | 1.9 | $1.8 \times 10^6$ | −9.1 | +5.2 |
| 8 | 1120 | 3030 | 1.4 | $5.3 \times 10^6$ | −8.5 | +6.4 |
| 9 | 1150 | 3070 | 1.5 | $2.6 \times 10^6$ | −7.1 | −2.4 |
| 10 | 1110 | 2910 | 3.1 | $7.5 \times 10^5$ | −7.4 | −3.8 |
| 11 | 1070 | 2760 | 2.4 | $1.1 \times 10^6$ | −9.5 | −6.8 |
| 12 | 1190 | 2870 | 1.7 | $2.1 \times 10^6$ | −9.0 | −9.2 |
| 13 | 1070 | 2810 | 2.3 | $1.5 \times 10^6$ | −7.2 | −1.5 |
| 14 | 1190 | 3230 | 1.8 | $1.6 \times 10^6$ | −6.5 | +4.8 |
| 15 | 1180 | 3120 | 1.9 | $1.4 \times 10^6$ | −7.2 | −4.3 |
| 16 | 1120 | 2900 | 1.3 | $5.8 \times 10^6$ | −7.4 | −2.3 |
| 17 | 1250 | Not coherently bonded on firing. | | | | |
| 18 | 1160 | 2890 | 1.3 | $3.8 \times 10^6$ | −8.8 | −2.5 |
| 19 | 1140 | 3110 | 1.8 | $3.5 \times 10^6$ | −6.3 | +1.4 |
| 20 | 1100 | 2970 | 1.5 | $5.8 \times 10^6$ | −8.2 | −0.6 |
| 21 | 1250 | Not coherently bonded on firing. | | | | |
| 22 | 1180 | 2830 | 1.7 | $3.5 \times 10^6$ | −13.5 | −8.5 |
| 23 | 1160 | 2920 | 1.5 | $3.7 \times 10^6$ | −7.8 | −6.4 |
| 24 | 1150 | 2860 | 1.6 | $3.3 \times 10^6$ | −7.2 | −3.2 |

TABLE 2-continued

| | | Firing Temperatures & Capacitor Characteristics | | | | |
|---|---|---|---|---|---|---|
| | | Capacitor Characteristics | | | | |
| Test No. | Firing Temp. (°C.) | Specific Dielectric Constant | Dielectric Loss (%) | Resistivity (megohm-cm) | Capacitance Variations (%) | |
| | | | | | At −25° C. | At +85° C. |
| 25 | 1190 | 3030 | 1.6 | $3.5 \times 10^6$ | −9.2 | +0.5 |
| 26 | 1070 | 2640 | 2.3 | $1.5 \times 10^6$ | −9.1 | −8.3 |
| 27 | 1070 | 2680 | 8.4 | $2.8 \times 10^3$ | −8.3 | −4.5 |
| 28 | 1140 | 3080 | 2.8 | $1.2 \times 10^6$ | −8.6 | +7.5 |

Before proceeding further with the examination of Table 2, we will determine the acceptable criteria of the four electrical characteristics in question of capacitors in general as follows:

Specific dielectric constant, at least 2000.
Dielectric loss, not more than 2.5 percent.
Resistivity, at least $1 \times 10^6$ megohm-centimeters.
Temperature dependence of capacitance, within plus or minus 10 percent.

A reconsideration of Table 2 in light of the above established criteria of favorable capacitor characteristics will reveal that the capacitors of Tests Nos. 2, 3, 4, 5, 10, 17, 21, 22, 27 and 28 do not meet these criteria. Accordingly, the corresponding ceramic compositions of Table 1 fall outside the scope of our invention.

Now, let us study the ceramic compositions of Table 1 and the corresponding capacitor characteristics of Table 2 in more detail. The ceramic composition of Test No. 17 contained no additive specified by our invention. The dielectric bodies formulated accordingly were not coherently bonded on firing at a temperature as high as 1250° C. Consider the ceramic composition of Test No. 7 for comparison. It contained 0.2 part by weight of the additive with respect to 100 parts by weight of the major ingredient. Even though the firing temperature was as low as 1170° C., the Test No. 9 capacitors possess the desired electrical characteristics. We set, therefore, the lower limit of the possible proportions of the additive at 0.2 part by weight with respect to 100 parts by weight of the major ingredient.

The Test No. 5 ceramic composition contained as much as 12 parts by weight of the additive with respect to 100 parts by weight of the major ingredient. The resulting capacitors have an average dielectric loss of 3.5 percent, which is higher than the above established criterion. However, when the proportion of the additive was reduced to 10 parts by weight, as in the Test No. 11 ceramic composition, then the resulting capacitors have the desired electrical characteristics. Accordingly, the upper limit of the possible proportions of the additive is set at 10 parts by weight with respect to 100 parts by weight of the major ingredient.

As for the major ingredient, $Ba_{k-x-y}M_xL_yO_kTiO_2$, the value of $x+y$ was set at 0.01 in Test No. 2. In the resulting capacitors, the average variations of capacitances at −25° and +85° C. are −12.4 and +11.1 percent, both outside the desired range of plus or minus 10 percent. However, when the value of $x+y$ was increased to 0.02, as in Test No. 1, then the desired electrical characteristics could all be obtained. Thus the lowermost possible value of $x+y$ is 0.02. The Test No. 22 composition had the value of $x+y$ set at as high as 0.06. In the resulting capacitors, the average variation of capacitance at −25° C. is −13.5 percent, which also is outside the desired range of plus or minus 10 percent. In Test No. 18, the value of $x+y$ was set slightly lower, at 0.05, and the resulting capacitors possess all the desired electrical characteristics. The uppermost possible value of $x+y$ is therefore 0.05.

The value of x was set at 0.001 in Test No. 28. The resulting capacitors has an average dielectric loss of 2.8 percent, which exceeds the desired limit of not more than 2.5 percent. The value of x was set at 0.002 in Tests Nos. 11 and 25, and the resulting capacitors had the desired electrical characteristics. The lowermost possible value of x is therefore 0.002.

Sr and Ca, represented by the capital L in the formula of the major ingredient, both function to expedite the sintering of the ceramic bodies formulated in accordance with our invention. As will be seen from Tests Nos. 12 and 26, Sr and Ca both perform their intended function when the value of y in the formula of the major ingredient is at least 0.001. The lowermost possible value of y is therefore 0.001.

Since we have set the maximum possible value of $x+y$ at 0.05, and the minimum possible value of y at 0.001, it follows that the maximum possible value of x is 0.049. Further, since we have set the minimum possible value of x at 0.002, the maximum possible value of y must be 0.048. As will be seen from the results of Table 2, x can be in the range of 0.002 to 0.049, y in the range of 0.001 to 0.048, and $x+y$ in the range of 0.02 to 0.05, regardless of whether either or both of Mg and Zn are employed as M, and whether either or both of Sr and Ca are employed as L.

The value of k in the formula of the major ingredient was set at 0.98 in Test No. 27, with the result that the average resistivity of the associated capacitors is $2.8 \times 10^3$ megohm-centimeters, much lower than the required minimum. However, the desired criteria of resistivity and other properties were obtained when k was set at 1.00 as in Tests Nos. 25 and 26. The lowermost possible value of k is therefore 1.00. On the other hand, when the value of k was increased to 1.05, as in Test No. 3, the resulting dielectric bodies were not coherently bonded on firing. As in Test No. 1, however, the desired electrical characteristics resulted when the value of k was set at 1.04. Accordingly, the uppermost possible value of k is 1.04.

Concerning the composition of the additive, the mixture of $Li_2O$ and $SiO_2$ in this Example, it will be noted from Test No. 10 that when the proportion of $SiO_2$ with respect to that of $Li_2O$ was set at 45 mole percent, the average dielectric loss of the resulting capacitors is 3.1 percent, much higher than the desired value of 2.5 percent. The desired electrical characteristics were all obtained, however, when the $SiO_2$ proportion was set at 50 mole percent as in Test No. 11. On the other hand, when the $SiO_2$ proportion was increased to 80 mole percent as in Test No. 21, the dielectric bodies of the resulting composition were not coherently bonded on firing. The desired electrical characteristics were all obtained when the $SiO_2$ proportion was up to only 75 mole percent as in Test No. 25. We conclude from these findings that the acceptable range of the proportions of $SiO_2$ is from 50 to 75 mole percent and, consequently, that the acceptable range of the proportions of $Li_2O$ is from 25 to 50 mole percent.

five mole percent $Li_2O$, 70 mole percent $SiO_2$, 15 mole percent BaO, 8.75 mole percent CaO, and 1.25 mole percent SrO. The proportions of the additives are given in parts by weight with respect to 100 parts by weight of the major ingredient.

TABLE 3

Ceramic Compositions

| Test No. | Major Ingredient (100 wt. pt.) | | | | | | | Additive | | | | | | |
|---|---|---|---|---|---|---|---|---|---|---|---|---|---|---|
| | | x | | | y | | | Propn. | Comp. (mole %) | | | MO (mole %) | | |
| | k − x − y | Mg | Zn | Total | Sr | Ca | Total | k | (wt. pt.) | $Li_2O$ | $SiO_2$ | MO | BaO | CaO | SrO |
| 29 | 1.02 | 0.005 | 0.005 | 0.01 | 0.01 | — | 0.01 | 1.04 | 10.0 | 5 | 70 | 25 | 60 | 35 | 5 |
| 30 | 1.03 | 0.005 | — | 0.005 | 0.005 | 0.01 | 0.015 | 1.05 | 3.0 | 15 | 55 | 30 | 90 | 5 | 5 |
| 31 | 1.02 | — | 0.005 | 0.005 | 0.005 | — | 0.005 | 1.03 | 5.0 | 40 | 55 | 5 | 50 | 50 | — |
| 32 | 1.01 | — | 0.01 | 0.01 | 0.01 | 0.01 | 0.02 | 1.04 | 3.0 | 25 | 60 | 15 | 30 | — | 70 |
| 33 | 1.01 | 0.01 | — | 0.01 | 0.03 | — | 0.03 | 1.05 | 7.0 | 25 | 60 | 15 | 70 | 30 | — |
| 34 | 1.00 | 0.005 | — | 0.005 | — | 0.005 | 0.005 | 1.01 | 5.0 | 20 | 65 | 15 | — | 20 | 80 |
| 35 | 1.00 | — | 0.005 | 0.005 | — | 0.015 | 0.015 | 1.02 | 1.0 | 25 | 70 | 5 | — | 50 | 50 |
| 36 | 1.00 | 0.01 | — | 0.01 | 0.005 | 0.005 | 0.01 | 1.02 | 0.0 | — | — | — | — | — | — |
| 37 | 1.00 | 0.01 | 0.01 | 0.02 | — | 0.01 | 0.01 | 1.03 | 1.0 | 15 | 60 | 25 | 60 | 15 | 35 |
| 38 | 1.00 | — | 0.01 | 0.01 | 0.02 | 0.01 | 0.03 | 1.04 | 1.0 | 25 | 55 | 20 | 50 | 35 | 15 |
| 39 | 1.00 | 0.01 | 0.01 | 0.02 | 0.01 | 0.01 | 0.02 | 1.04 | 1.0 | 24 | 75 | 1 | 100 | — | — |
| 40 | 0.99 | 0.005 | 0.005 | 0.01 | 0.005 | 0.005 | 0.01 | 1.01 | 1.0 | 30 | 50 | 20 | 40 | 45 | 15 |
| 41 | 0.99 | 0.01 | — | 0.01 | 0.02 | — | 0.02 | 1.02 | 7.0 | 20 | 40 | 40 | 30 | 65 | 5 |
| 42 | 0.99 | — | 0.002 | 0.002 | — | 0.028 | 0.028 | 1.02 | 1.0 | 15 | 55 | 30 | 60 | 20 | 20 |
| 43 | 0.99 | 0.01 | 0.01 | 0.02 | 0.01 | — | 0.01 | 1.02 | 1.0 | 20 | 70 | 10 | — | 70 | 30 |
| 44 | 0.99 | 0.01 | 0.02 | 0.03 | 0.01 | — | 0.01 | 1.03 | 3.0 | 40 | 55 | 5 | 50 | — | 50 |
| 45 | 0.99 | — | 0.049 | 0.049 | — | 0.001 | 0.001 | 1.04 | 10.0 | 10 | 50 | 40 | 20 | 55 | 25 |
| 46 | 0.99 | — | 0.02 | 0.02 | — | 0.03 | 0.03 | 1.04 | 3.0 | 15 | 70 | 15 | 80 | — | 20 |
| 47 | 0.98 | 0.002 | — | 0.002 | 0.018 | — | 0.018 | 1.0 | 0.2 | 39 | 60 | 1 | — | 100 | — |
| 48 | 0.98 | — | 0.02 | 0.02 | — | 0.01 | 0.01 | 1.01 | 3.0 | 10 | 55 | 35 | 100 | — | — |
| 49 | 0.98 | — | 0.02 | 0.02 | — | 0.01 | 0.01 | 1.01 | 3.0 | 10 | 55 | 35 | — | 100 | — |
| 50 | 0.98 | — | 0.02 | 0.02 | — | 0.01 | 0.01 | 1.01 | 3.0 | 10 | 55 | 35 | — | — | 100 |
| 51 | 0.98 | — | 0.01 | 0.01 | — | 0.03 | 0.03 | 1.02 | 5.0 | 15 | 80 | 5 | — | 50 | 50 |
| 52 | 0.98 | 0.03 | — | 0.03 | — | 0.01 | 0.01 | 1.02 | 1.0 | 30 | 60 | 10 | 20 | 80 | — |
| 53 | 0.98 | 0.02 | — | 0.02 | 0.03 | — | 0.03 | 1.03 | 1.0 | 30 | 65 | 5 | 50 | — | 50 |
| 54 | 0.97 | — | 0.002 | 0.002 | 0.028 | — | 0.028 | 1.0 | 0.2 | 49 | 50 | 1 | — | 100 | — |
| 55 | 0.97 | 0.01 | — | 0.01 | 0.01 | 0.01 | 0.02 | 1.0 | 12.0 | 35 | 60 | 5 | 50 | 50 | — |
| 56 | 0.97 | 0.02 | — | 0.02 | 0.01 | 0.01 | 0.02 | 1.01 | 3.0 | 20 | 65 | 15 | 20 | 40 | 40 |
| 57 | 0.97 | 0.03 | — | 0.03 | 0.01 | — | 0.01 | 1.01 | 12.0 | 10 | 65 | 25 | 5 | 90 | 5 |
| 58 | 0.97 | — | 0.002 | 0.002 | 0.048 | — | 0.048 | 1.02 | 0.2 | 40 | 50 | 10 | 5 | 75 | 20 |
| 59 | 0.97 | — | 0.01 | 0.01 | — | 0.04 | 0.04 | 1.02 | 1.0 | 15 | 65 | 20 | 20 | 20 | 60 |
| 60 | 0.97 | 0.01 | 0.01 | 0.02 | 0.02 | 0.01 | 0.03 | 1.02 | 0.2 | 30 | 55 | 15 | 5 | 5 | 90 |
| 61 | 0.97 | — | 0.03 | 0.03 | 0.01 | 0.01 | 0.02 | 1.02 | 5.0 | 45 | 40 | 15 | 20 | 5 | 75 |
| 62 | 0.96 | 0.01 | — | 0.01 | 0.01 | 0.02 | 0.03 | 1.00 | 0.2 | 20 | 50 | 30 | 5 | 35 | 60 |
| 63 | 0.06 | — | 0.03 | 0.03 | — | 0.01 | 0.01 | 1.00 | 3.0 | — | 55 | 45 | 40 | 30 | 30 |
| 64 | 0.96 | 0.01 | — | 0.01 | 0.04 | — | 0.04 | 1.01 | 3.0 | 20 | 55 | 25 | 30 | 20 | 50 |
| 65 | 0.96 | — | 0.02 | 0.02 | 0.02 | 0.01 | 0.03 | 1.01 | 1.0 | 5 | 75 | 20 | 35 | 35 | 30 |
| 66 | 0.95 | — | 0.002 | 0.002 | 0.028 | — | 0.028 | 0.98 | 10.0 | 30 | 55 | 15 | 45 | 20 | 35 |
| 67 | 0.95 | 0.002 | — | 0.002 | — | 0.048 | 0.048 | 1.00 | 1.0 | 10 | 70 | 20 | 70 | 15 | 15 |
| 68 | 0.95 | 0.049 | — | 0.049 | 0.001 | — | 0.001 | 1.00 | 0.2 | 29 | 70 | 1 | — | — | 100 |
| 69 | 0.95 | 0.03 | — | 0.03 | 0.01 | 0.01 | 0.02 | 1.00 | — | — | — | — | — | — | — |
| 70 | 0.94 | 0.01 | 0.01 | 0.02 | 0.02 | 0.02 | 0.04 | 1.00 | 0.2 | 20 | 65 | 15 | 35 | 55 | 10 |
| 71 | 0.93 | 0.02 | — | 0.02 | 0.01 | 0.01 | 0.02 | 0.98 | 2.0 | 10 | 60 | 30 | 25 | 40 | 35 |
| 72 | 0.981 | 0.001 | — | 0.001 | — | 0.02 | 0.02 | 1.00 | 1.0 | 30 | 60 | 10 | 40 | 30 | 30 |

EXAMPLE II

In this Example, we added MO (at least one of BaO, CaO, and SrO) to the additive which, in the preceding Example, was a mixture of only $Li_2O$ and $SiO_2$. We prepared various ceramic compositions set forth as Tests Nos. 29 through 72 in Table 3. As will be seen from this Table, the atomic numbers k-x-y, x, y and k of the major ingredient, $Ba_{k-x-y}M_xL_yO_kTiO_2$, were determined variously. The relative proportions of the ingredients, $Li_2O$, $SiO_2$, and MO, of the additive were also determined variously and are given in mole percent in Table 3. As the MO, we employed one, two, or all of BaO, CaO, and SrO. In cases where two or three of these compounds were employed in combination, their relative proportions were also determined variously and are expressed in mole percent in Table 3. Thus, in Test No. 29, for instance, the additive in use was a mixture of With use of the ceramic compositions of Table 3, we formulated test capacitors of the same construction as those of Example I through the same procedure as in Example I. Then we measured the four electrical properties in question of the thus fabricated test capacitors by the same methods as in Example I. The results were as given in Table 4. We also gave in this Table the maximum temperatures at which the molded bodies of the respective compositions were fired in the nonoxidative atmosphere. The atmosphere was, of course, reductive, consisting of molecular hydrogen and molecular nitrogen.

Figure 3:
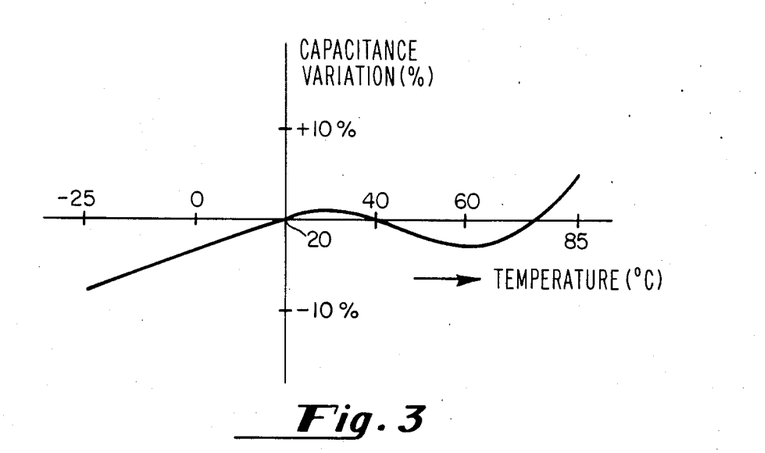
FIG. 3 is a graph plotting the average capacitance-temperature characteristic of test capacitors, each constructed as in FIG. 1, manufactured in Test No. 29 in Example II of our invention.

The average capacitance-temperature characteristic of the Test No. 29 capacitors is represented more exactly in the graph of FIG. 3. The capacitors of Test Nos. 30 through 72 exhibited a more or less similar capacitance-temperature characteristic in the same temperature range.

TABLE 4

Firing Temperatures & Capacitor Characteristics

| Test No. | Firing Temp. (°C.) | Capacitor Characteristics ||||  |
|---|---|---|---|---|---|---|
| | | Specific Dielectric Constant | Dielectric Loss (%) | Resistivity (megohm-cm) | Capacitance Variations (%) ||
| | | | | | At −25° C. | At +85° C. |
| 29 | 1070 | 2820 | 1.6 | $2.1 \times 10^6$ | −7.2 | +4.8 |
| 30 | | Not coherently bonded on firing. |||||
| 31 | 1090 | 2910 | 1.1 | $6.8 \times 10^6$ | −11.2 | +10.6 |
| 32 | 1120 | 3020 | 0.9 | $6.5 \times 10^6$ | −9.2 | +2.5 |
| 33 | 1070 | Not coherently bonded on firing. |||||
| 34 | 1110 | 2950 | 1.0 | $6.4 \times 10^6$ | −12.8 | +11.6 |
| 35 | 1160 | 3100 | 1.2 | $4.2 \times 10^6$ | −8.7 | +6.3 |
| 36 | 1250 | Not coherently bonded on firing. |||||
| 37 | 1160 | 3090 | 1.3 | $4.2 \times 10^6$ | −7.4 | −2.6 |
| 38 | 1150 | 3020 | 1.2 | $3.8 \times 10^6$ | −7.2 | −1.4 |
| 39 | 1160 | 2990 | 1.8 | $2.6 \times 10^6$ | −7.3 | −1.2 |
| 40 | 1150 | 3050 | 1.3 | $3.5 \times 10^6$ | −9.1 | +4.8 |
| 41 | 1250 | 2930 | 1.5 | $5.4 \times 10^6$ | −5.8 | +2.1 |
| 42 | 1160 | 3150 | 1.3 | $3.4 \times 10^6$ | −6.2 | +1.8 |
| 43 | 1160 | 3080 | 1.1 | $4.1 \times 10^6$ | −7.2 | +2.3 |
| 44 | 1110 | 2870 | 1.2 | $6.3 \times 10^6$ | −6.8 | −2.4 |
| 45 | 1070 | 2640 | 1.8 | $2.5 \times 10^6$ | −9.6 | −9.1 |
| 46 | 1130 | 2840 | 0.8 | $6.7 \times 10^6$ | −9.5 | −5.4 |
| 47 | 1170 | 3210 | 2.2 | $1.5 \times 10^6$ | −6.2 | +4.8 |
| 48 | 1130 | 3000 | 0.9 | $6.9 \times 10^6$ | −7.2 | −2.2 |
| 49 | 1130 | 2990 | 0.8 | $7.0 \times 10^6$ | −7.4 | −3.2 |
| 50 | 1130 | 2980 | 0.9 | $6.9 \times 10^6$ | −7.0 | −3.4 |
| 51 | 1250 | Not coherently bonded on firing. |||||
| 52 | 1150 | 2910 | 1.0 | $3.2 \times 10^6$ | −7.3 | −6.5 |
| 53 | 1150 | 2820 | 1.4 | $2.8 \times 10^6$ | −9.4 | −3.4 |
| 54 | 1170 | 3230 | 1.8 | $1.4 \times 10^6$ | −6.7 | +4.5 |
| 55 | 1070 | 2740 | 2.3 | $5.7 \times 10^5$ | −7.1 | −4.9 |
| 56 | 1130 | 2890 | 0.9 | $6.9 \times 10^6$ | −6.7 | −3.8 |
| 57 | 1070 | 2610 | 2.6 | $6.8 \times 10^5$ | −9.5 | −9.7 |
| 58 | 1170 | 3020 | 1.6 | $1.8 \times 10^6$ | −9.1 | +0.7 |
| 59 | 1160 | 2950 | 1.2 | $3.5 \times 10^6$ | −9.2 | −5.1 |
| 60 | 1180 | 3010 | 1.3 | $1.9 \times 10^6$ | −9.1 | −6.3 |
| 61 | 1250 | Not coherently bonded on firing. |||||
| 62 | 1180 | 3170 | 1.2 | $2.0 \times 10^6$ | −8.3 | −1.4 |
| 63 | 1250 | Not coherently bonded on firing. |||||
| 64 | 1120 | 2800 | 0.9 | $3.5 \times 10^6$ | −7.8 | +1.2 |
| 65 | 1250 | Not coherently bonded on firing. |||||
| 66 | 1070 | 2740 | 7.8 | $2.5 \times 10^3$ | −8.3 | −3.2 |
| 67 | 1160 | 2960 | 1.1 | $2.2 \times 10^6$ | −8.7 | −4.3 |
| 68 | 1190 | 2870 | 1.7 | $2.0 \times 10^6$ | −9.1 | −9.6 |
| 69 | 1250 | Not coherently bonded on firing. |||||
| 70 | 1190 | 2910 | 1.2 | $3.8 \times 10^6$ | −13.8 | −8.7 |
| 71 | 1120 | 2930 | 8.9 | $3.2 \times 10^3$ | −7.3 | −5.8 |
| 72 | 1140 | 3090 | 2.6 | $2.6 \times 10^6$ | −8.5 | +7.5 |

Prior to a detailed discussion of the results of Table 4, we will first point out that the measured properties of Tests Nos. 30, 31, 33, 34, 36, 41, 51, 55, 57, 61, 63, 65, 66, 69, 70, 71 and 72 do not meet the above established criteria of favorable capacitors. The corresponding ceramic compositions of Table 3 fall, therefore, outside the scope of our invention.

The Test No. 36 composition contained no additive, and the resulting dielectric bodies were not coherently bonded on firing at a temperature as high as 1250° C. However, when 0.2 part by weight of the additive (mixture of $Li_2O$, $SiO_2$, BaO, CaO and SrO) was added to 100 parts by weight of the major ingredient, as in Test No. 60, the capacitors of the desired electrical characteristics could be obtained by firing at a lower temperature of 1180° C. The lower limit of the possible proportions of the additive is thus set at 0.2 part by weight with respect to 100 parts by weight of the major ingredient even when the additive contains MO, just as when it does not. When as much as 12 parts by weight of the additive (mixture of $Li_2O$, $SiO_2$, BaO, CaO, and SrO) was added to 100 parts by weight of the major ingredient, as in Test No. 57, the resulting capacitors had the average dielectric loss of as much as 2.6 percent. Capacitors of the desired characteristics could be obtained when the proportion of the additive was reduced to 10 parts by weight, as in Test No. 29. The upper limit of the possible proportions of the additive (including MO) is, therefore, also 10 parts by weight with respect to 100 parts by weight of the major ingredient, just as in cases where the additive contains no MO.

As for the major ingredient, $Ba_{k-x-y}M_xL_yO_kTiO_2$, the value of x+y was set at 0.01 in Test No. 31. In the resulting capacitors, the average variations of capacitances at −25 and +85 C. are −11.2 and +10.6 percent, both outside the desired range of plus or minus 10 percent. However, when the value of x+y was increased to 0.02, as in Test No. 29, then the desired electrical characteristics could all be obtained. Thus the lowermost possible value of x+y is 0.02. The Test No. 70 composition had the value of x+y set at as high as 0.06. In the resulting capacitors, the average variation of capacitance at −25° C. is −13.8 percent, which also is outside the desired range of plus or minus 10 percent. In Test No. 46, the value of x+y was set slightly lower, at 0.05, and the resulting capacitors possess all the desired electrical characteristics. The uppermost possible value of x+y is therefore 0.05.

The value of x was set at 0.001 in Test No. 72. The resulting capacitors has an average dielectric loss of 2.6 percent, which exceeds the desired limit of not more than 2.5 percent. The value of x was set at 0.002 in Tests Nos. 42 and 47, and the resulting capacitors had the desired electrical characteristics. The lowermost possible value of x is therefore 0.002.

Sr and Ca, represented by the capital L in the formula of the major ingredient, both function as aforesaid to expedite the sintering of the ceramic bodies formulated in accordance with our invention. As will be seen from Tests Nos. 45 and 68, Sr and Ca both perform their intended function when the value of y in the formula of the major ingredient is at least 0.001. The lowermost possible value of y is therefore 0.001, regardless of whether the additive of the ceramic compositions in accordance with our invention contains MO or not.

Since we have set the maximum possible value of $x+y$ at 0.05, and the minimum possible value of y at 0.001, it follows that the maximum possible value x is 0.049, as in Tests Nos. 45 and 68, just as in cases where the additive contains no MO. Further, since we have set the minimum possible value of x at 0.002, the maximum possible value of y is necessarily 0.048, as in Tests Nos. 58 and 67, just as in cases where the additive contains no MO. As will be seen from the results of Table 4, x can be in the range of 0.002 to 0.049, y in the range of 0.001 to 0.048, and $x+y$ in the range of 0.02 to 0.05, regardless of whether either or both of Mg and Zn are employed as M, and whether either or both of Sr and Ca are employed as L.

The value of k in the formula of the major ingredient was set at 0.98 in Test No. 66, with the result that the average resistivity of the associated capacitors is $2.6 \times 10^3$ megohm-centimeters, much lower than the required minimum. However, the desired criteria of resistivity and other properties were obtained when k was set at 1.00 as in Tests Nos. 47 and 54. The lowermost possible value of k is therefore 1.00. On the other hand, when the value of k was increased to 1.05, as in Test No. 30, the resulting dielectric bodies were not coherently bonded on firing. As in Test No. 32, however, the desired electrical characteristics resulted when the value of k was set at 1.04. Accordingly, the uppermost possible value of k is 1.04, just as in cases where the additive contains no MO.

Figure 4:
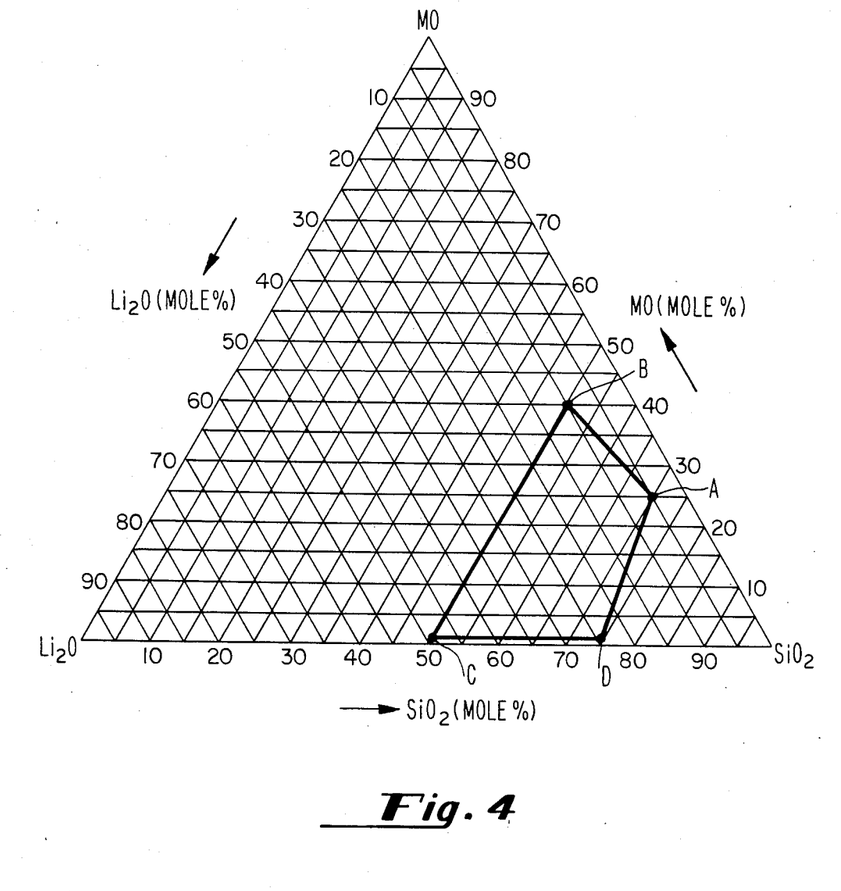
FIG. 4 is a ternary diagram depicting the proportions of $Li_2O$, $SiO_2$, and MO (at least one of BaO, CaO and SrO) which can be employed in combination as an additive mixture in the ceramic compositions in accordance with our invention.

We have ascertained from the results of Table 4 that, when the additive mixture contains MO (one or more of BaO, CaO, and SrO), the acceptable relative proportions of $Li_2O$, $SiO_2$, and MO can be determined in accordance with the indications of the ternary diagram of FIG. 4. The point A in this diagram represents the Test No. 29 additive composition of five mole percent $Li_2O$, 70 mole percent $SiO_2$, and 25 mole percent MO. The point B indicates the Test No. 45 additive composition of 10 mole percent $Li_2O$, 50 mole percent $SiO_2$, and 40 mole percent MO. The point C indicates the Test No. 54 additive composition of 49 mole percent $Li_2O$, 50 mole percent $SiO_2$, and one mole percent MO. The point D indicates the Test No. 39 additive composition of 24 mole percent $Li_2O$, 75 mole percent $SiO_2$, and one mole percent MO. The relative proportions of the additive mixture of $Li_2O$, $SiO_2$, and MO in accordance with our invention all fall within the region bounded by the lines sequentially connecting the above points A, B, C and D.

Table 4 proves that the additive compositions within this region makes possible the provision of capacitors of the desired electrical characteristics. The additive compositions of Tests Nos. 51, 61, 63, and 65 are all outside that region, and the corresponding dielectric bodies were not coherently bonded on firing. In the case of the Test No. 41 additive composition, also outside the required range, the dielectric bodies were not coherently bonded on firing at temperatures less than 1200° C. The above specified recommended range of the relative proportions of the additive mixture holds true regardless of whether only one of BaO, CaO, and SrO is employed as MO, as in Test Nos. 39, 47, 48, 49, 50, and 54, or two or all of them are employed in suitable proportions as in the other Tests.

Although we have disclosed our invention in terms of specific Examples thereof, we understand that our invention is not to be limited by the exact details of such disclosure but is susceptible to a variety of modifications within the usual knowledge of the ceramics or chemicals specialists without departing from the scope of the invention. The following, then, is a brief list of such possible modifications:

1. The low temperature sintered ceramic material of our invention might include various additives not disclosed herein. An example is a mineralizer such as manganese dioxide. Used in a proportion (preferably from 0.05 to 0.10 percent by weight) not adversely affecting the desired properties of the inventive ceramic compositions, such a mineralizer would improve their sinterability.

2. The start materials for the ceramic compositions of our invention might be substances other than those employed in the Examples herein, examples being oxides such as BaO and $Li_2O$, hydroxides, etc.

3. The temperature of reheating in an oxidative atmosphere might be determined variously in consideration of such factors as the particular base metal electrode material in use and the degree of oxidation required for the ceramic material.

4. The temperature of co-sintering in a nonoxidative atmosphere might also be changed in consideration of the particular electrode material in use.

5. The low temperature sinterable ceramic material of our invention might be used as the dielectric bodies of capacitors other than those of the multilayered type disclosed herein.

6. The atmosphere of sintering could be neutral.

What we claim is:

1. A process for the fabrication of coherently bonded bodies of a low temperature sintered ceramic material, for particular use as the dielectric bodies of capacitors, which comprises:

forming green bodies of desired shape and size from a mixture of 100 parts by weight of $Ba_{k-x-y}M_xL_yO_k\text{-}TiO_2$ in finely divided form, where M is at least either of magnesium and zinc, where L is at least either of strontium and calcium, where k is a numeral in the range of 1.00 to 1.04 and x a numeral in the range of 0.002 to 0.049, where y is a numeral in the range of 0.001 to 0.048, and $x+y$ is a value in the range of 0.02 to 0.05, and 0.2 to 10.0 parts by weight of an additive mixture consisting essentially fo 25 to 50 mole percent lithium oxide and 50 to 75 mole percent silicon dioxide in finely divided form for providing upon firing coherently bonded dielectric bodies with a specific dielectric constant in excess of 2000, dielectric losses of less than 2.5 percent, resistivity of over $1 \times 10^6$ megohm-centimeters and capacitance temperature dependence of + or −10% in a temperature range of −25° to +85° C.;

sintering the green bodies to maturity in a nonoxidative atmosphere at a temperature not to exceed 1300° C.; and reheating the sintered bodies in an oxidative atmosphere at a temperature lower than said preceding sintering temperature.

2. A process for the fabrication of coherently bonded bodies of a low temperature sintered ceramic material, for particular use as the dielectric bodies of capacitors, which comprises:

forming green bodies of desired shape and size from a mixture of 100 parts by weight of $Ba_{k-x-y}M_xL_yO_k\text{-}TiO_2$ in finely divided form, where M is at least either of magnesium, and zinc, where L is at least either of strontium and calcium, where k is a numeral in the range of 1.00 to 1.04 and x a numeral in the range of 0.002 to 0.049, where y is a numeral in the range of 0.001 to 0.048, and x+y is a value in the range of 0.02 to 0.05, and 0.2 to 10.0 parts by weight of an additive mixture consisting essentially of lithium oxide and silicon dioxide and a metal oxide selected from the group consisting of barium oxide, calcium oxide, strontium oxide, and combinations thereof, in finely divided form, wherein the range of the relative proportions of lithium oxide, silicon dioxide, and the selected metal oxide constituting the additive is in that region of the ternary diagram of FIG. 4 attached hereto which is bounded by the lines sequentially connecting:

the point A where the additive consists of 5 mole percent lithium oxide, 70 mole percent silicon dioxide, and 25 mole percent metal oxide;

the point B where the additive consists of 10 mole percent lithium oxide, 50 mole percent silicon dioxide, and 40 mole percent metal oxide;

the point C where the additive consists of 49 mole percent lithium oxide, 50 mole percent silicon dioxide, and one mole percent metal oxide; and the point D where the additive consists of 24 mole percent lithium oxide, 75 mole percent silicon dioxide, and one mole percent metal oxide;

for providing upon firing coherently bonded dielectric bodies with a specific dielectric constant in excess of 2000, dielectric losses of less than 2.5 percent, resistivity of over $1 \times 10^6$ megohm-centimeters and capacitance temperature dependence of + or −10% in a temperature range of −25° to +85° C.;

sintering the green bodies to maturity in a nonoxidative atmosphere at a temperature not to exceed 1300° C.; and reheating the sintered bodies in an oxidative atmosphere at a temperature lower than said preceding sintering temperature.

3. A process for the fabrication of coherently bonded bodies of a low temperature sintered ceramic material as set forth in claim 1 or claim 2, wherein the bodies are sintered in a temperature range of 1050° to 1200° C.

4. A process for the fabrication of coherently bonded bodies of a low temperature sintered ceramic material as set forth in claim 3, wherein the sintered bodies are reheated in a temperature range of 500° to 1000° C.

* * * * *